United States Patent
Zhang

(10) Patent No.: US 12,425,734 B2
(45) Date of Patent: Sep. 23, 2025

(54) IMAGE CAPTURE METHOD, IMAGE CAPTURE APPARATUS, READABLE STORAGE MEDIUM

(71) Applicant: VIVO MOBILE COMMUNICATION CO., LTD., Guangdong (CN)

(72) Inventor: Zhouchen Zhang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 139 days.

(21) Appl. No.: 18/137,227

(22) Filed: Apr. 20, 2023

(65) Prior Publication Data

US 2023/0262331 A1    Aug. 17, 2023

Related U.S. Application Data

(63) Continuation of application No. PCT/CN2021/125179, filed on Oct. 21, 2021.

(30) Foreign Application Priority Data

Oct. 27, 2020  (CN) .......................... 202011164722.2

(51) Int. Cl.
  *H04N 23/68*   (2023.01)
(52) U.S. Cl.
  CPC .......... *H04N 23/687* (2023.01); *H04N 23/683* (2023.01)
(58) Field of Classification Search
  CPC ............... H04N 23/687; H04N 23/683; H04N 23/6812; H04N 23/6811; H04N 23/73;
  (Continued)

(56) References Cited

U.S. PATENT DOCUMENTS 8,493,454 B1 * 7/2013 Kohn ................. H04N 23/6815
                                                         348/208.4
8,749,648 B1    6/2014 Kohn et al.
(Continued)

FOREIGN PATENT DOCUMENTS

CN    109672819 A    4/2019
CN    110035222 A    7/2019
(Continued)

OTHER PUBLICATIONS

CN Office Action dated Aug. 3, 2021 as received in Application No. 202011164722.2.
(Continued)

*Primary Examiner* — Chiawei Chen
(74) *Attorney, Agent, or Firm* — Price Heneveld LLP

(57) ABSTRACT

This application discloses an image capture method and apparatus, a mobile terminal, and a storage medium, and specifically relates to the field of electronic devices. A driving motor is controlled to drive the image capture module to move from the first position to the preset second position; an angular velocity signal, a captured next frame image, and the first position of the image capture module are received during a capture period of the next frame image of the image capture; the captured next frame image is cropped according to the first position, the preset second position, the angular velocity signal, and a preset electronic image stabilization algorithm; and the driving motor is controlled, based on the angular velocity signal and the first position of the image capture module, to perform an optical image stabilization operation.

13 Claims, 9 Drawing Sheets

(58) Field of Classification Search
CPC .......... H04N 23/685; H04N 5/77; G03B 5/00; G03B 2205/0007; G03B 2205/0053; G06T 2207/20132
See application file for complete search history.

(56) References Cited

U.S. PATENT DOCUMENTS

| | | |
|---|---|---|
| 2014/0211064 A1 | 7/2014 | Sasaki et al. |
| 2014/0267807 A1 | 9/2014 | Miyahara |
| 2015/0036047 A1* | 2/2015 | Bledsoe .................. H04N 23/51 348/375 |
| 2017/0041545 A1* | 2/2017 | Murgia .............. H04N 23/6812 |
| 2019/0007617 A1 | 1/2019 | Kitagawa |
| 2019/0191090 A1* | 6/2019 | Murashima .......... H04N 23/685 |
| 2019/0281221 A1* | 9/2019 | Kuwahara ............... H04N 5/265 |
| 2020/0137309 A1* | 4/2020 | Kulik .................. H04N 23/6812 |
| 2021/0274099 A1 | 9/2021 | Pan et al. |

FOREIGN PATENT DOCUMENTS

| | | |
|---|---|---|
| CN | 110166695 A | 8/2019 |
| CN | 110636216 A | 12/2019 |
| CN | 111355888 A | 6/2020 |
| CN | 112261311 A | 1/2021 |
| JP | 2014182209 A | 9/2014 |
| JP | 2016031380 A | 3/2016 |
| JP | 2020020913 A | 2/2020 |
| WO | 2013047241 A1 | 4/2013 |
| WO | 2017170165 A1 | 10/2017 |
| WO | 2020111267 A1 | 6/2020 |

OTHER PUBLICATIONS

International Search Report and Written Opinion of the International Searching Authority dated Jan. 10, 2022 as received in Application No. PCT/CN2021/125179.

* cited by examiner

IMAGE CAPTURE METHOD, IMAGE CAPTURE APPARATUS, READABLE STORAGE MEDIUM

CROSS-REFERENCE TO RELATED APPLICATIONS

The present disclosure is a continuation application of International Application No. PCT/CN2021/125179 filed on Oct. 21, 2021, which claims priority to Chinese Patent Application No. 202011164722.2, filed with the China National Intellectual Property Administration, Oct. 27, 2020 and entitled "IMAGE CAPTURE METHOD AND APPARATUS, MOBILE TERMINAL, AND STORAGE MEDIUM", which is incorporated herein by reference in its entirety.

TECHNICAL FIELD

This application pertains to the field of image capture, and specifically relates to an image capture method and apparatus, a mobile terminal, and a storage medium.

BACKGROUND

With development of science and technology, mobile terminals (such as mobile phones and tablets) have entered millions of households, providing great convenience to people's lives. Generally, mobile terminals are integrated with image capture functions (such as picture shooting and video recording). When a user takes a picture with a mobile terminal, hand shaking usually occurs. As a result, a position center of an image capture module shifts from an initial optical center, and the resulting image is blurry.

In the prior art, generally, only one optical image stabilization method is used to control a position of an image capture module so that a position center of the image capture module does not shift from an initial optical center. However, this causes the position center of the image capture module to continuously drift and gradually move away from the optical center. As a result, the image capture module can move only within a limited space during optical image stabilization on a next image frame, and compensation is insufficient. Moreover, cropping captured images by using only one electronic image stabilization method to keep the optical center fixed is at the expense of much resolution of an image frame.

SUMMARY

Embodiments of this application are intended to provide an image capture method and apparatus, a mobile terminal, and a storage medium.

In order to resolve the foregoing technical problem, this application is implemented as follows:

According to a first aspect, an embodiment of this application provides an image capture method, where the image capture method includes:

in a case that a first position of an image capture module is recognized as not being at a preset second position in a frame gap of image capture, controlling a driving motor to drive the image capture module to move from the first position to the preset second position;

receiving an angular velocity signal, a captured next frame image, and the first position of the image capture module during a capture period of the next frame image of the image capture; and in a case that the first position of the image capture module has not returned to the preset second position, cropping the captured next frame image according to the first position, the preset second position, the angular velocity signal, and a preset electronic image stabilization algorithm so that an optical center of the next frame image remains unchanged; or in a case that the first position has returned to the preset second position, controlling, based on the angular velocity signal and the first position of the image capture module, the driving motor to perform an optical image stabilization operation.

According to a second aspect, an embodiment of this application further provides an image capture apparatus, where the apparatus includes:

a first control unit, configured to: in a case that a first position of an image capture module is recognized as not being at a preset second position in a frame gap of image capture, control a motor to drive the image capture module to move from the first position to the preset second position;

an information receiving unit, configured to receive an angular velocity signal, a captured next frame image, and the first position of the image capture module during a capture period of the next frame image of the image capture;

an image cropping unit, configured to: in a case that the first position of the image capture module has not returned to the preset second position, crop the captured next frame image according to the first position, the preset second position, the angular velocity signal, and a preset electronic image stabilization algorithm so that an optical center of the next frame image remains unchanged; and a second control unit, configured to: in a case that the first position has returned to the preset second position, control, based on the angular velocity signal and the first position of the image capture module, the driving motor to perform an optical image stabilization operation.

According to a third aspect, an embodiment of this application further provides another mobile terminal including a processor, a memory, and a program or instructions stored in the memory and capable of running on the processor, where when the program or instructions are executed by the processor, the steps of the image capture method according to the first aspect of this embodiment of this application are implemented.

According to a fourth aspect, an embodiment of this application further provides a readable storage medium, where the readable storage medium stores a program or instructions, and when the program or instructions are executed by a processor, the steps of the image capture method according to the second aspect of this embodiment of this application are implemented.

According to a fifth aspect, an embodiment of this application provides a chip, where the chip includes a processor and a communications interface, the communications interface is coupled to the processor, and the processor is configured to run a program or instructions so as to implement the image capture method according to the first aspect of this embodiment of this application.

In the embodiments of this application, first, in a case that a first position of an image capture module is recognized as not being at a preset second position in a frame gap of image capture, a driving motor is controlled to drive the image capture module to move from the first position to the preset second position. Then, an angular velocity signal, a captured next frame image, and the first position of the image capture module are received during a capture period of the next frame image of the image capture. Next, in a case that the first position of the image capture module has not returned to the preset second position, the captured next frame image is cropped according to the first position, the preset second position, the angular velocity signal, and a preset electronic image stabilization algorithm so that an optical center of the next frame image remains unchanged. Because the first position of the image capture module is pulled back from a position away from the preset second position to a position near the preset second position, the captured next frame image is cropped slightly, sacrificing minor resolution of the image frame. Finally, in a case that the first position has returned to the preset second position, the driving motor is controlled, based on the angular velocity signal and the first position of the image capture module, to perform an optical image stabilization operation, where since the first position has returned to the preset second position, a space where the image capture module can move in an optical image stabilization operation on the next image frame is maximized, thereby avoiding insufficient position compensation.

DESCRIPTION OF EMBODIMENTS

The following clearly describes the technical solutions in the embodiments of this application with reference to the accompanying drawings in the embodiments of this application. Apparently, the described embodiments are a part rather than all of the embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that the terms used in this way are interchangeable in appropriate circumstances such that the embodiments of this application can be implemented in other orders than the order illustrated or described herein. In addition, "and/or" in the specification and claims represents at least one of connected objects, and the character "/" generally indicates that the associated objects have an "or" relationship.

An image capture method and apparatus, a mobile terminal, and a storage medium provided in the embodiments of this application are hereinafter described in detail by using specific embodiments and application scenarios thereof with reference to the accompanying drawings.

Figure 1:
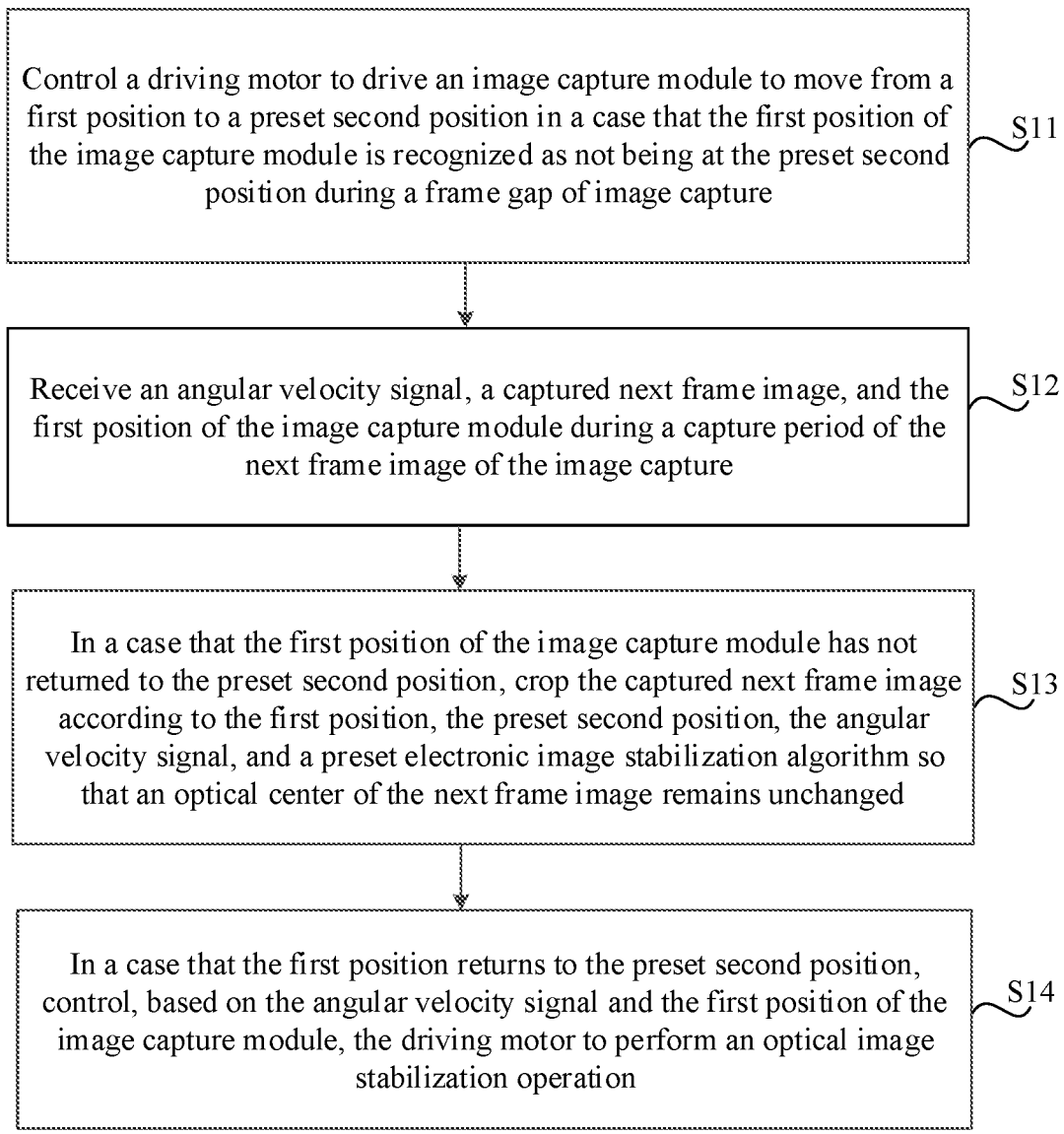
FIG. 1 is a flowchart of an image capture method according to an embodiment of this application.
Figure 2:
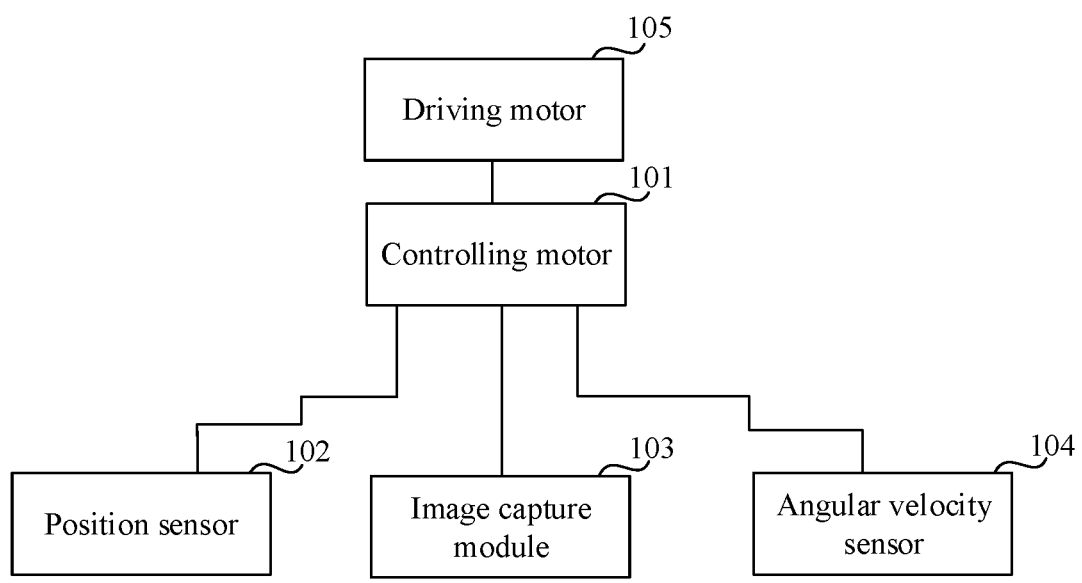
FIG. 2 is a block diagram of circuit connections of a mobile terminal according to an embodiment of this application.

Refer to FIG. 1, which shows an image capture method according to an embodiment of this application. The image capture method is applied to a control unit 101. The control unit 101 is installed on a mobile terminal 800, and the mobile terminal 800 further includes a position sensor 102, an image capture module 103, a driving motor 105, and an angular velocity sensor 104. As shown in FIG. 2, the control unit 101 is electrically connected to the position sensor 102 (for example, it may be a Hall sensor), the image capture module 103, the driving motor 105, and the angular velocity sensor 104. The control unit 101 may include a master control chip and a stabilizing control module disposed separately; or a system on chip (SOC) integrated with a master control chip and a stabilizing control module. In a case that the control unit 101 includes a master control chip and a stabilizing control module disposed separately, the master control chip is electrically connected to the image capture module 103, the stabilizing control module, and the angular velocity sensor 104, and the stabilizing control module is electrically connected to the angular velocity sensor 104, the position sensor 102, and the image capture module 103. The method includes the following steps.

S11. In a case that a first position of an image capture module 103 is recognized as not being at a preset second position in a frame gap of image capture, control a driving motor 105 to drive the image capture module 103 to move from the first position to the preset second position; The first position is a current position of the image capture module and the preset second position is a position of the image capture module 103 in an idle state.

Figure 3:
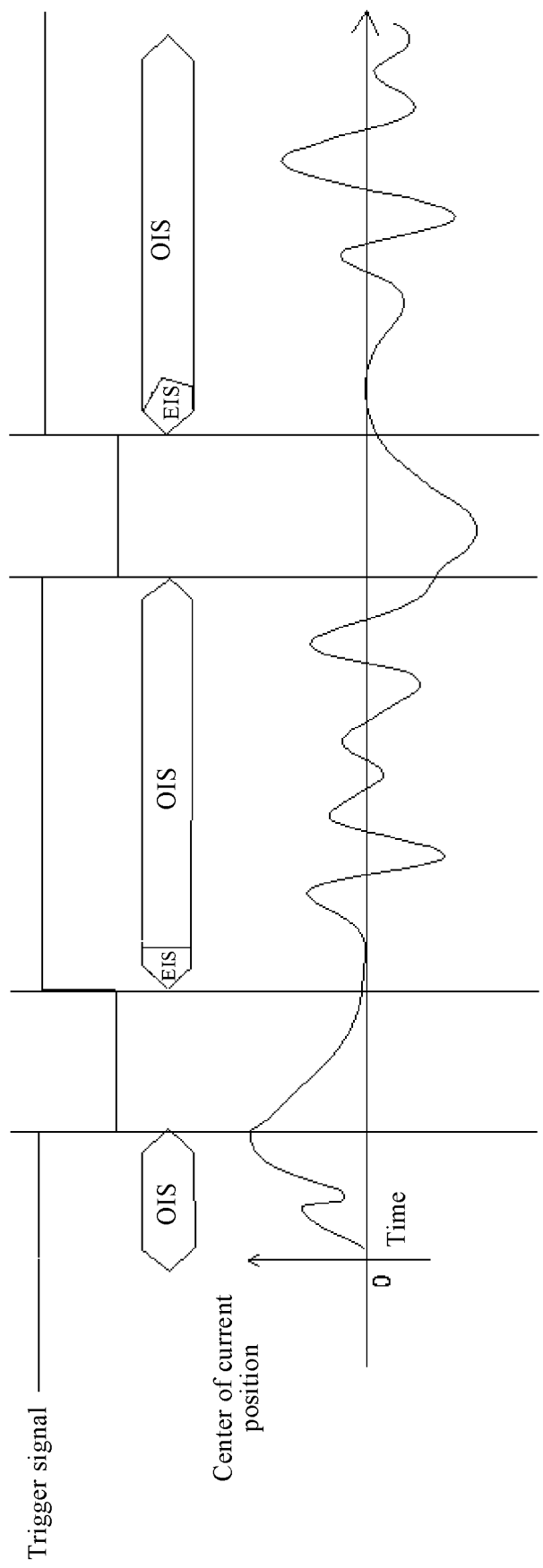
FIG. 3 is a sequence diagram of an image capture method according to an embodiment of this application.

As shown in FIG. 3, when starting to capture an image, the image capture module 103 sends a first trigger signal (such as a high-level signal) to the control unit 101 to notify the control unit 101 to enter an image capture period; after receiving an angular velocity signal transmitted by the angular velocity sensor 104 (indicating that the mobile terminal 800 jitters), the control unit 101 converts the angular velocity signal into a vibration displacement and controls, according to the vibration displacement, the driving motor 105 to drive the image capture module 103 to move a target distance so as to compensate for the vibration displacement (that is, an optical image stabilization operation). For example, assuming that the vibration displacement is 2 distance units moved upward, the target distance is 2 distance units moved downward to avoid blurring of a captured image frame. After the capture of the first frame image ends, the image capture module 103 sends a second trigger signal (such as a low-level signal) to the control unit 101 to notify the control unit 101 to enter a frame gap. Then, the control unit 101 receives the first position of the image capture module 103 transmitted by the position sensor 102, determines whether the first position of the image capture module 103 is at the preset second position, and if the first position of the image capture module 103 is not at the preset second position, controls the driving motor 105 to drive the image capture module 103 to move from the first position to the preset second position (that is, the image capture module 103 needs to be pulled back from the first position to the preset second position). Specifically, S11 can be performed by the stabilizing control module.

S12. Receive an angular velocity signal, a captured next frame image, and the first position of the image capture module 103 during a capture period of the next frame image of the image capture.

Specifically, in an implementation, the angular velocity signal, the captured next frame image, and the first position of the image capture module 103 that are transmitted by the image capture module 103 through a mobile industry processor interface can be received synchronously. Specifically, the angular velocity signal transmitted by the angular velocity sensor 104 and the first position of the image capture module 103 transmitted by the position sensor 102 can be received by the stabilizing control module first; then the stabilizing control module transmits the angular velocity signal, and the first position to the image capture module 103, and the image capture module 103 transmits the angular velocity signal, the first position, and the captured next frame image synchronously to the master control chip.

Specifically, in another implementation, the master control chip can receive the next frame image transmitted by the image capture module 103, the angular velocity signal transmitted by the angular velocity sensor 104, and the first position transmitted by the position sensor 102.

In addition, it should be noted that the image capture manner includes but is not limited to picture shooting and video recording.

S13. In a case that the first position of the image capture module 103 has not returned to the preset second position, crop the captured next frame image according to the first position, the preset second position, the angular velocity signal, and a preset electronic image stabilization algorithm so that an optical center of the next frame image remains unchanged.

As shown in FIG. 3, at a start time of capturing the next frame image, a position center of the image capture module 103 is already at a short distance from an initial position center, and therefore the captured next frame image is cropped slightly, sacrificing minor resolution of the image frame, such that the optical center of the next frame remains unchanged.

S14: In a case that the first position has returned to the preset second position, control, based on the angular velocity signal and the first position of the image capture module 103, the driving motor 105 to perform an optical image stabilization operation.

As the first position has returned to the preset second position, a space where the image capture module 103 can move is maximized during an optical image stabilization operation on the next image frame, thereby avoiding insufficient position compensation. The optical image stabilization principle is: hand vibration is detected by the angular velocity sensor, and the hand vibration is converted to an electrical signal, the electrical signal is processed by the control unit 101 and used to control the image capture module 103 to perform translation, so as to offset imaging light shift caused by the hand vibration.

It can be understood that S12 to S14 can be implemented by the master control chip.

According to the image capture method, first, in a case that a first position of an image capture module 103 is recognized as not being at a preset second position in a frame gap of image capture, a driving motor 105 is controlled to drive an image capture module 103 to move from the first position to the preset second position. Then, an angular velocity signal, a captured next frame image, and the first position of the image capture module 103 are received during a capture period of the next frame image of image capture. Next, in a case that the first position of the image capture module 103 has not returned to the preset second position, the captured next frame image is cropped according to the first position, the preset second position, the angular velocity signal, and a preset electronic image stabilization algorithm so that an optical center of the next frame image remains unchanged. Because the image capture module 103 is pulled back from a position away from the preset second position to a position near the preset second position, the captured next frame image is cropped slightly, sacrificing minor resolution of the image frame; and finally, in a case that the first position has returned to the preset second position, the driving motor 105 is controlled, based on the angular velocity signal and the first position of the image capture module 103, to perform an optical image stabilization operation. As the first position has returned to the preset second position, a space where the image capture module 103 can move is maximized during an optical image stabilization operation on the next image frame, thereby avoiding insufficient position compensation.

Figure 4:
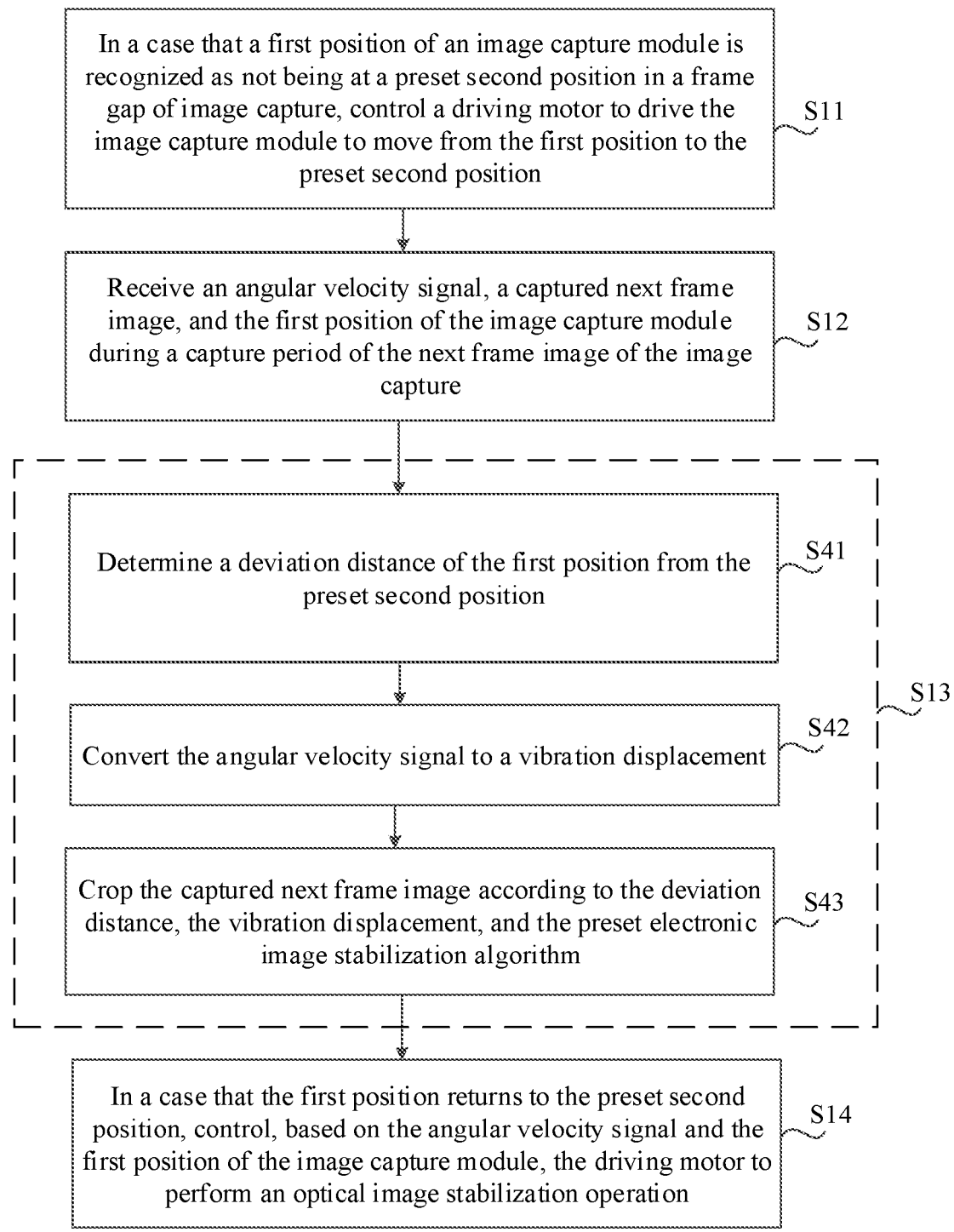
FIG. 4 is a flowchart of an image capture method according to an embodiment of this application.

In an implementation, as shown in FIG. 4, S13 includes the following steps.

S41. Determine a deviation distance of a first position from a preset second position.

S42. Convert the angular velocity signal to a vibration displacement.

S43. Crop the captured next frame image according to the deviation distance, the vibration displacement, and the preset electronic image stabilization algorithm.

The electronic image stabilization algorithm on the mobile terminal 100 forcibly increases light-sensitive parameters of the image capture module, accelerates the shutter, and analyzes an image captured by the image capture module, and then crops the image for compensation to avoid blurring and achieve a stabilizing purpose. The electronic image stabilization is actually a technique used to compensate for shaking at expense of reducing image quality.

Figure 5:
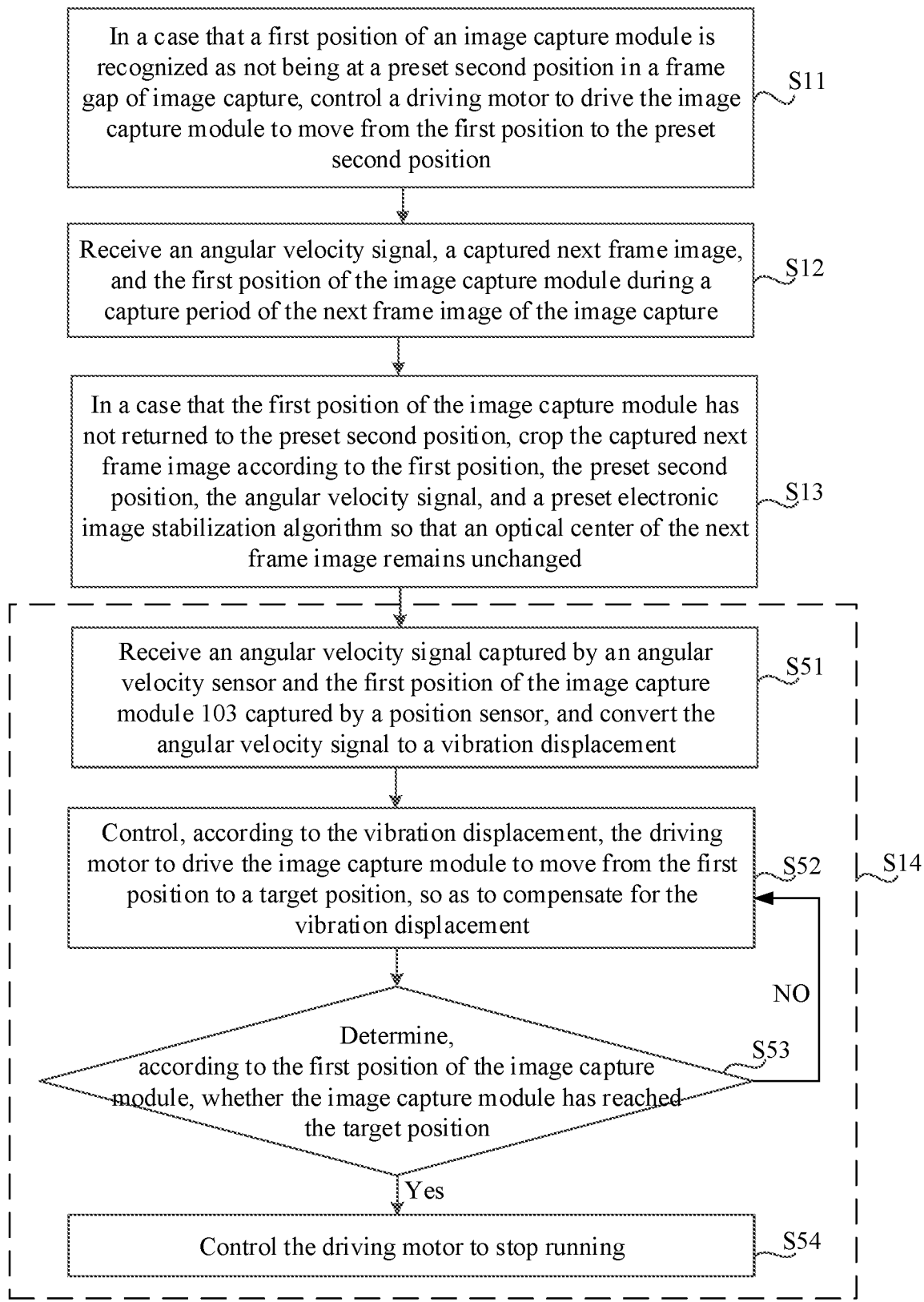
FIG. 5 is a flowchart of an image capture method according to an embodiment of this application.

In an implementation, as shown in FIG. 5, S15 includes the following steps.

S51. Receive an angular velocity signal captured by an angular velocity sensor 104 and the first position of the image capture module 103 captured by a position sensor 102, and convert the angular velocity signal to a vibration displacement.

S52. Control, according to the vibration displacement, the driving motor 105 to drive the image capture module 103 to move from the first position to a target position, so as to compensate for the vibration displacement.

S53. Determine, according to the first position of the image capture module 103, whether the image capture module 103 has reached the target position; and if the image capture module 103 has reached the target position, execute S54; or if the image capture module 103 has not reached the target position, return to execute S52.

S54. Control the driving motor 105 to stop running.

Figure 6:
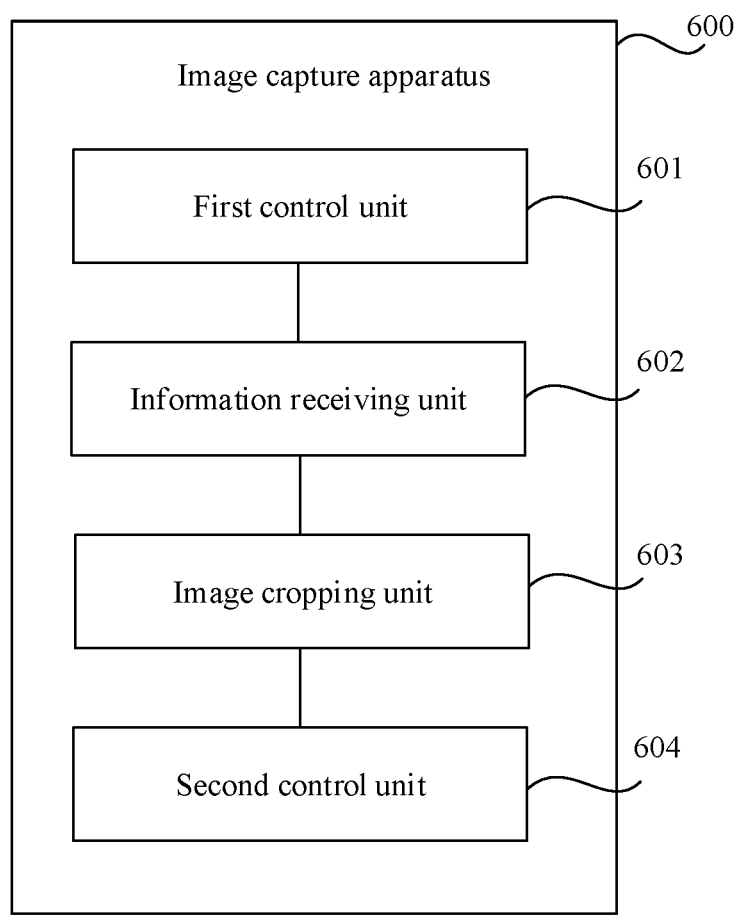
FIG. 6 is a block diagram of a functional module of an image capture apparatus according to an embodiment of this application.

Refer to FIG. 6, which shows an image capture apparatus 600 further provided according to an embodiment of this application. It should be noted that the image capture apparatus 600 provided in this embodiment of this application has the same basic principle and achieves the same technical effects as the foregoing embodiment, and for brief description, refer to corresponding contents in the foregoing embodiment where not mentioned in the embodiment part of this application. The apparatus 600 includes a first control unit 601, an information receiving unit 602, an image cropping unit 603, and a second control unit 604.

The first control unit 601 is configured to: in a case that the first position of the image capture module 103 is recognized as not being at the preset second position in a frame gap of image capture, control the motor to drive an image capture module 103 to move from a first position to a preset second position.

The information receiving unit 602 is configured to receive an angular velocity signal, a captured next frame image, and the first position of the image capture module 103 during a capture period of the next frame image of the image capture.

The image cropping unit 603 is configured to: in a case that the first position of the image capture module 103 has not returned to the preset second position, crop a captured next frame image according to the first position, the preset second position, the angular velocity signal, and a preset electronic image stabilization algorithm so that an optical center of the next frame image remains unchanged.

The second control unit 604 is configured to: in a case that the first position has returned to the preset second position, control, based on the angular velocity signal and the first position of the image capture module 103, a driving motor 105 to perform an optical image stabilization operation.

The image capture apparatus 600 can perform the following functions: first, in a case that a first position of an image capture module 103 is recognized as not being at a preset second position in a frame gap of image capture, control a driving motor 105 to drive the image capture module 103 to move from the first position to the preset second position; then, receive an angular velocity signal, a captured next frame image, and the first position of the image capture module 103 during a capture period of the next frame image of the image capture. Next, in a case that the first position of the image capture module 103 has not returned to the preset second position, crop the captured next frame image according to the first position, the preset second position, the angular velocity signal, and a preset electronic image stabilization algorithm so that an optical center of the next frame image remains unchanged. Because the first position of the image capture module 103 is pulled back from a position away from the preset second position to a position near the preset second position, the captured next frame image is cropped slightly and very little resolution of the image frame is scarified; and finally, in a case that the first position has returned to the preset second position, control, based on the angular velocity signal and the first position of the image capture module 103, the driving motor 105 to perform an optical image stabilization operation, where since the first position has returned to the preset second position, a space where the image capture module 103 can move is maximized during an optical image stabilization operation on the next image frame, thereby avoiding insufficient position compensation.

Figure 7:
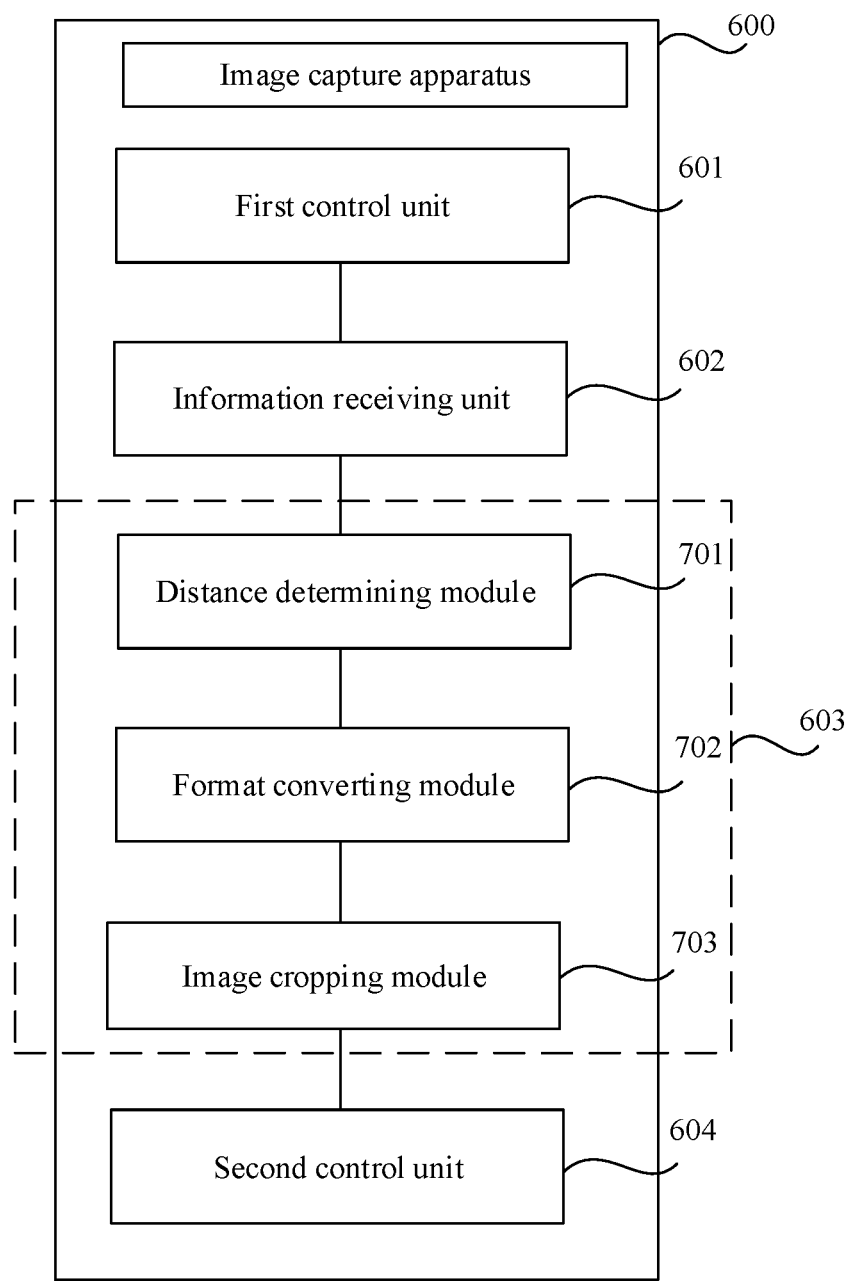
FIG. 7 is a block diagram of a functional module of an image capture apparatus according to an embodiment of this application.

As shown in FIG. 7, the image cropping unit 603 includes:
a distance determining module 701, configured to determine a deviation distance of the first position from the preset second position;
a format converting module 702, configured to convert an angular velocity signal to a vibration displacement; and
an image cropping module 703, configured to crop the captured next frame image according to the deviation distance, the vibration displacement, and the preset electronic image stabilization algorithm.

Figure 8:
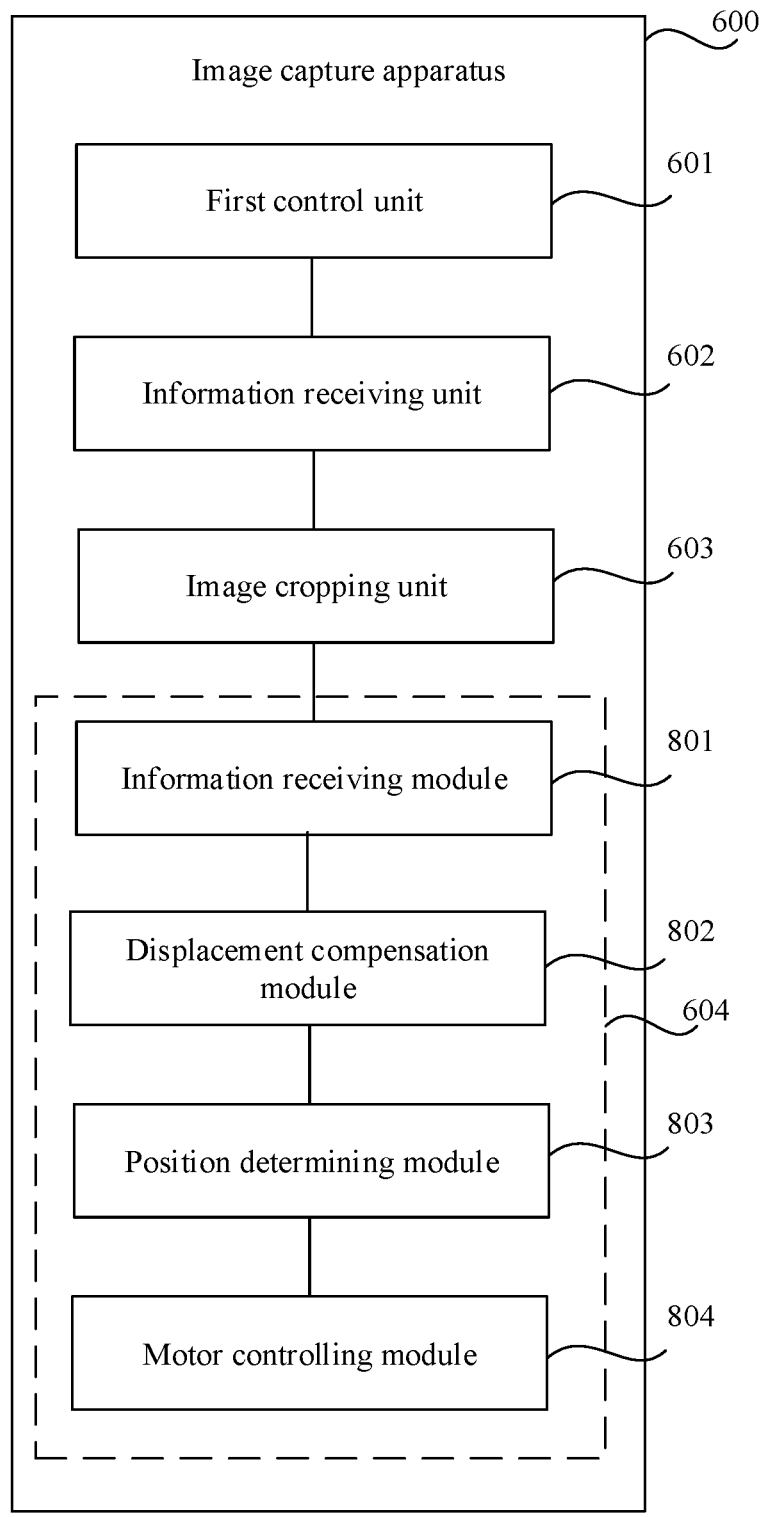
FIG. 8 is a block diagram of a functional module of an image capture apparatus according to an embodiment of this application.

As shown in FIG. 8, the second control unit 604 includes:
an information receiving module 801, configured to receive an angular velocity signal captured by an angular velocity sensor 104 and a first position of an image capture module 103 captured by a position sensor 102, and convert the angular velocity signal to a vibration displacement;
a displacement compensation module 802, configured to control, according to the vibration displacement, the driving motor 105 to drive the image capture module 103 to move from the first position to a target position, so as to compensate for the vibration displacement;
a position determining module 803, configured to determine, according to the first position of the image capture module 103, whether the image capture module 103 has reached the target position; and
a motor controlling module 804, configured to: in a case that the image capture module 103 has reached the target position, control the driving motor 105 to stop running; or in a case that the image capture module 103 has not reached the target position, continuously control the driving motor 105 to drive the image capture module to move from the first position to the target position.

The image capture apparatus in this embodiment of this application may be an apparatus, or may be a component, an integrated circuit, or a chip in a terminal. The apparatus may be a mobile electronic device, such as a mobile terminal, or a non-mobile electronic device. For example, the mobile electronic device may be a mobile phone, a tablet computer, a notebook computer, a palmtop computer, an in-vehicle electronic device, a removable terminal, an ultra-mobile personal computer (UMPC), a netbook, a personal digital assistant (PDA), or the like. The non-mobile electronic device may be a server, a network-attached storage (NAS), a personal computer (PC), a television (TV), a teller machine, a self-service machine, or the like. This is not specifically limited in the embodiments of this application.

The image capture apparatus in this embodiment of this application may be an apparatus having an operating system. The operating system may be an Android operating system, an iOS operating system, or another possible operating system, which is not specifically limited in the embodiments of this application.

The image capture apparatus provided in this embodiment of this application is capable of implementing the processes implemented by the image capture apparatus in the method embodiments in FIG. 1 to FIG. 5. To avoid repetition, details are not described herein again.

Figure 9:
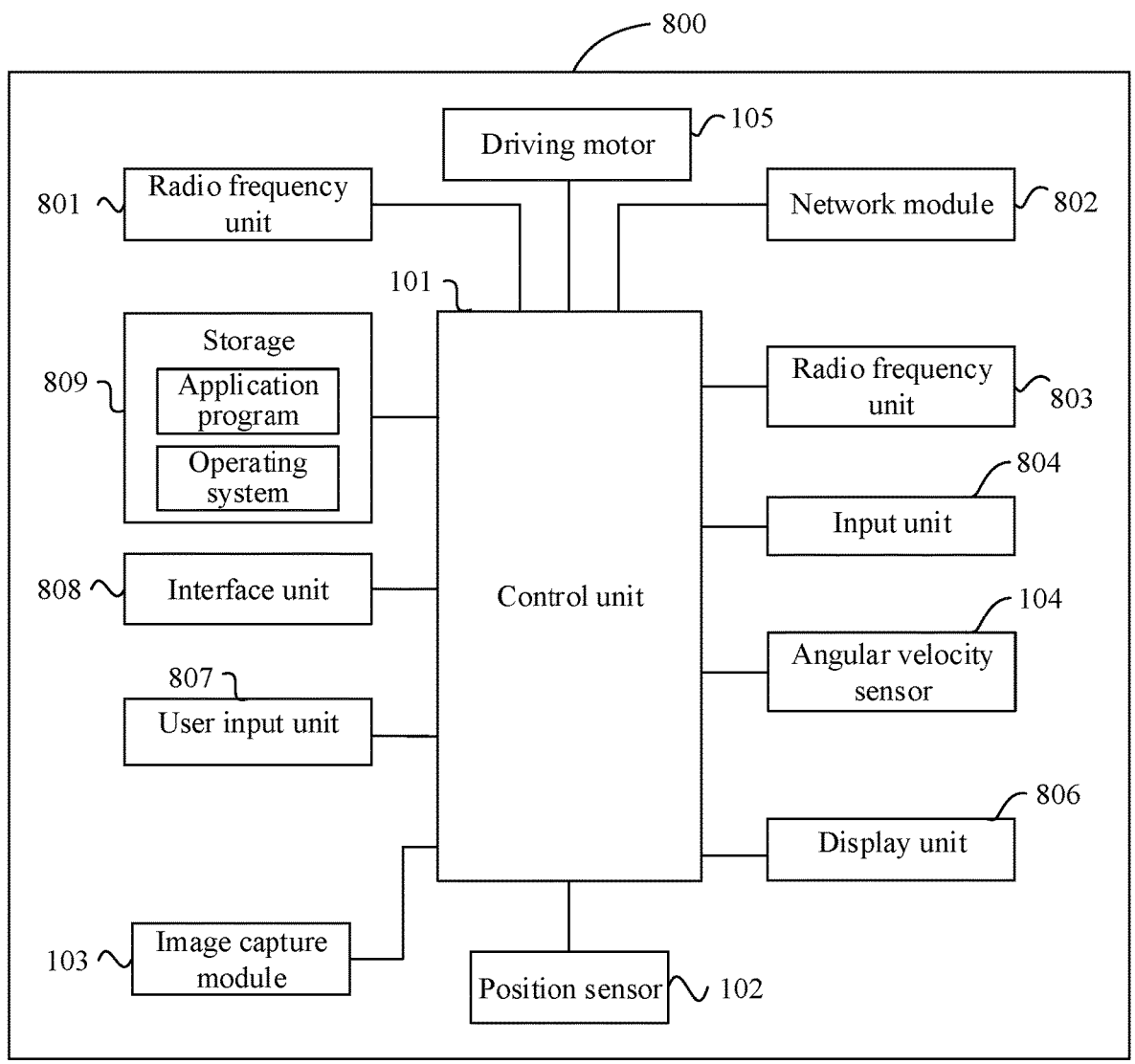
FIG. 9 is a block diagram of circuit connections of a mobile terminal according to an embodiment of this application.

FIG. 9 is a schematic diagram of a hardware structure of a mobile terminal for implementing the embodiments of this application.

The mobile terminal 800 includes but is not limited to a radio frequency unit 801, a network module 802, an audio output unit 803, an input unit 804, a position sensor 102, a display unit 806, a user input unit 807, an interface unit 808, a memory 809, a control unit 101, a driving motor 105, an angular velocity sensor 104, and an image capture module 103.

Persons skilled in the art can understand that the mobile terminal 800 may further include a power supply (for example, a battery) supplying power to the components, and the power supply may be logically connected to the control unit 101 through a power management system. In this way, functions such as charge management, discharge management, and power consumption management are implemented by using the power management system. The structure of the mobile terminal as shown in FIG. 8 does not constitute any limitation on the mobile terminal. The mobile terminal may include more or fewer components than shown in the figure, or a combination of some components, or the components disposed differently. Details are not described herein again.

The control unit 101 is configured to: in a case that a first position of an image capture module is recognized as not being at a preset second position in a frame gap of image capture, control a driving motor to drive the image capture module to move from the first position to the preset second position.

An angular velocity signal, a captured next frame image, and the first position of the image capture module are received during a capture period of the next frame image of the image capture.

In a case that the first position of the image capture module has not returned to the preset second position, the captured next frame image is cropped according to the first position, the preset second position, the angular velocity signal, and a preset electronic image stabilization algorithm so that an optical center of the next frame image remains unchanged.

In a case that the first position has returned to the preset second position, the driving motor is controlled, based on the angular velocity signal and the first position of the image capture module, to perform an optical image stabilization operation.

An embodiment of this application further provides a readable storage medium. The readable storage medium stores a program or instructions. When the program or instructions are executed by a processor, the processes of the foregoing image capture method embodiments are implemented, with the same technical effects achieved. To avoid repetition, details are not described again herein.

The processor is a processor in the mobile device described in the foregoing embodiments. The readable storage medium includes a computer-readable storage medium, such as a computer read-only memory (ROM), a random access memory (RAM), a magnetic disk, or an optical disc.

An embodiment of this application further provides a chip. The chip includes a processor and a communications interface. The communications interface is coupled to the processor. The processor is configured to run a program or instructions to implement each process of the foregoing image capture method embodiment, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

Based on the foregoing description of the implementations, persons skilled in the art may clearly understand that the method in the foregoing embodiment may be implemented by software with a necessary general hardware platform. Certainly, the method in the foregoing embodiment may also be implemented by hardware. However, in many cases, the former is a preferred implementation. Based on such an understanding, the technical solutions of this application essentially or the part contributing to the prior art may be implemented in a form of a software product. The software product may be stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in each embodiment of this application.

The embodiments of this application are described above with reference to the accompanying drawings, but this application is not limited to the embodiments. The embodiments are only illustrative rather than restrictive. Inspired by this application, persons of ordinary skill in the art can still derive a plurality of variations without departing from the essence of this application and the protection scope of the claims. All these variations shall fall within the protection of this application.

What is claimed is:

1. An image capture method, wherein the method comprises:
   in a case that a first position of an image capture module is recognized as not being at a preset second position in a frame gap of image capture, controlling a driving motor to drive the image capture module to move from the first position to the preset second position;
   receiving an angular velocity signal, a captured next frame image, and the first position of the image capture module during a capture period of the next frame image of the image capture; and
   in a case that the first position of the image capture module has not returned to the preset second position, cropping the captured next frame image according to the first position, the preset second position, the angular velocity signal, and a preset electronic image stabilization algorithm so that an optical center of the next frame image remains unchanged; or
   in a case that the first position of the image capture module has returned to the preset second position, controlling, based on the angular velocity signal and the first position of the image capture module, the driving motor to perform an optical image stabilization operation.

2. The method according to claim 1, wherein the cropping the captured next frame image according to the first position, the preset second position, the angular velocity signal, and a preset electronic image stabilization algorithm comprises:
   determining a deviation distance of the first position from the preset second position;
   converting the angular velocity signal to a vibration displacement; and
   cropping the captured next frame image according to the deviation distance, the vibration displacement, and the preset electronic image stabilization algorithm.

3. The method according to claim 1, wherein the controlling, based on the angular velocity signal and the first position of the image capture module, the driving motor to perform an optical image stabilization operation comprises:
receiving an angular velocity signal captured by an angular velocity sensor and a first position of an image capture module captured by a position sensor, and converting the angular velocity signal to a vibration displacement;
controlling, according to the vibration displacement, the driving motor to drive the image capture module to move from the first position to a target position, so as to compensate for the vibration displacement;
determining, according to the first position of the image capture module, whether the image capture module has reached the target position; and
in a case that the image capture module has reached the target position, controlling the driving motor to stop running; or
in a case that the image capture module has not reached the target position, continuously controlling the driving motor to drive the image capture module to move from the first position to the target position.

4. The method according to claim 1, wherein the receiving an angular velocity signal, a captured next frame image, and the first position of the image capture module comprises:
synchronously receiving an angular velocity signal, the captured next frame image, and the first position of the image capture module that are transmitted by the image capture module through a mobile industry processor interface.

5. The method according to claim 1, wherein the image capture is performed in a picture shooting or video recording mode.

6. An image capture apparatus, wherein the apparatus comprises: a memory, a processor and a computer program stored in the memory and executable by the processor, wherein the processor executes the computer program to:
in a case that a first position of an image capture module is recognized as not being at a preset second position in a frame gap of image capture, control a driving motor to drive the image capture module to move from the first position to the preset second position;
receive an angular velocity signal, a captured next frame image, and the first position of the image capture module during a capture period of the next frame image of the image capture;
in a case that the first position of the image capture module has not returned to the preset second position, crop the captured next frame image according to the first position, the preset second position, the angular velocity signal, and a preset electronic image stabilization algorithm so that an optical center of the next frame image remains unchanged; and
in a case that the first position of the image capture module has returned to the preset second position, control, based on the angular velocity signal and the first position of the image capture module, a driving motor to perform an optical image stabilization operation.

7. The apparatus according to claim 6, wherein the processor executes the computer program to:
determine a deviation distance of the first position from the preset second position;
convert the angular velocity signal to a vibration displacement; and
crop the captured next frame image according to the deviation distance, the vibration displacement, and the preset electronic image stabilization algorithm.

8. The apparatus according to claim 6, wherein the processor executes the computer program to:
receive an angular velocity signal captured by an angular velocity sensor and a first position of an image capture module captured by a position sensor, and convert the angular velocity signal to a vibration displacement;
control, according to the vibration displacement, the driving motor to drive the image capture module to move from the first position to a target position, so as to compensate for the vibration displacement;
determine, according to the first position of the image capture module, whether the image capture module has reached the target position; and
in a case that the image capture module has reached the target position, control the driving motor to stop running; or in a case that the image capture module has not reached the target position, continuously control the driving motor to drive the image capture module to move from the first position to the target position.

9. A non-transitory readable storage medium, wherein the readable storage medium stores a program or instructions, a processor executes the program or instructions to:
in a case that a first position of an image capture module is recognized as not being at a preset second position in a frame gap of image capture, control a driving motor to drive the image capture module to move from the first position to the preset second position;
receive an angular velocity signal, a captured next frame image, and the first position of the image capture module during a capture period of the next frame image of the image capture; and
in a case that the first position of the image capture module has not returned to the preset second position, crop the captured next frame image according to the first position, the preset second position, the angular velocity signal, and a preset electronic image stabilization algorithm so that an optical center of the next frame image remains unchanged; or
in a case that the first position of the image capture module has returned to the preset second position, control, based on the angular velocity signal and the first position of the image capture module, the driving motor to perform an optical image stabilization operation.

10. The non-transitory readable storage medium according to claim 9, wherein the processor executes the program or instructions to:
determine a deviation distance of the first position from the preset second position;
convert the angular velocity signal to a vibration displacement; and
crop the captured next frame image according to the deviation distance, the vibration displacement, and the preset electronic image stabilization algorithm.

11. The non-transitory readable storage medium according to claim 9, wherein the processor executes the program or instructions to:
receive an angular velocity signal captured by an angular velocity sensor and a first position of an image capture module captured by a position sensor, and convert the angular velocity signal to a vibration displacement;
control, according to the vibration displacement, the driving motor to drive the image capture module to move from the first position to a target position, so as to compensate for the vibration displacement;

determine, according to the first position of the image capture module, whether the image capture module has reached the target position; and in a case that the image capture module has reached the target position, control the driving motor to stop running; or in a case that the image capture module has not reached the target position, continuously control the driving motor to drive the image capture module to move from the first position to the target position.

12. The non-transitory readable storage medium according to claim 9, wherein the processor executes the program or instructions to:

synchronously receive an angular velocity signal, the captured next frame image, and the first position of the image capture module that are transmitted by the image capture module through a mobile industry processor interface.

13. The non-transitory readable storage medium according to claim 9, wherein the image capture is performed in a picture shooting or video recording mode.

\* \* \* \* \*